(12) United States Patent
Esteghlal (10) Patent No.: US 10,707,748 B2
(45) Date of Patent: Jul. 7, 2020

(54) CONTROL DEVICE FOR DC CONVERTER, DC CONVERTER, AND METHOD FOR CONTROLLING A DC CONVERTER

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/341,014

(22) PCT Filed: Oct. 2, 2017

(86) PCT No.: PCT/EP2017/074938
§ 371 (c)(1),
(2) Date: Apr. 10, 2019

(87) PCT Pub. No.: WO2018/069076
PCT Pub. Date: Apr. 19, 2018

(65) Prior Publication Data
US 2020/0186026 A1    Jun. 11, 2020

(30) Foreign Application Priority Data

Oct. 11, 2016 (DE) .......................... 10 2016 219 740

(51) Int. Cl.
*H02M 3/04* (2006.01)
(52) U.S. Cl.
CPC .................................... *H02M 3/04* (2013.01)
(58) Field of Classification Search
CPC ............ H02M 3/00; H02M 3/02; H02M 3/04; H02M 3/145; H02M 3/155; H02M 3/156; H02M 3/157; H02M 3/158; H02M 3/1584; H02M 2003/075

See application file for complete search history.

(56) References Cited

U.S. PATENT DOCUMENTS

| 8,829,872 B1 * | 9/2014 | Pierson ................... H02M 1/14 323/272 |
| 2003/0107352 A1 | 6/2003 | Downer et al. |

(Continued)

FOREIGN PATENT DOCUMENTS

| DE | 102007025229 | 12/2008 |
| EP | 1143591 | 10/2001 |

(Continued)

OTHER PUBLICATIONS

International Search Report for Application No. PCT/EP2017/074938 dated Dec. 20, 2017 (English Translation, 3 pages).

*Primary Examiner* — Adolf D Berhane
(74) *Attorney, Agent, or Firm* — Michael Best & Friedrich LLP (57) ABSTRACT

The invention relates to control of a DC converter having multiple parallel-connected DC converter modules. Here, a common variable for the voltage control is formed for the control of all the DC converter modules. In addition, a separate current controller is provided for each DC converter module. For each DC converter module, a control variable can be formed from the individually determined current control and the jointly determined voltage control.

11 Claims, 5 Drawing Sheets

(56) References Cited

U.S. PATENT DOCUMENTS

| | | | | |
|---|---|---|---|---|
| 2005/0093525 A1* | 5/2005 | Walters | ............... | H02M 3/1584 |
| | | | | 323/272 |
| 2006/0164050 A1* | 7/2006 | Hasegawa | ........... | H02M 3/1584 |
| | | | | 323/272 |
| 2007/0013350 A1* | 1/2007 | Tang | ................... | H02M 3/1584 |
| | | | | 323/237 |
| 2007/0096705 A1 | 5/2007 | Chen | | |
| 2014/0292293 A1* | 10/2014 | Feckl | .................... | H02M 3/156 |
| | | | | 323/282 |
| 2015/0207400 A1* | 7/2015 | Shenoy | ............... | H02M 3/1584 |
| | | | | 323/213 |
| 2018/0168555 A1* | 6/2018 | Kim | .................... | H02M 3/1584 |
| 2018/0212457 A1* | 7/2018 | Haefele | ................ | H02M 3/285 |
| 2018/0358891 A1* | 12/2018 | Diotte | .................... | H02M 1/08 |
| 2019/0181752 A1* | 6/2019 | Esteghlal | .............. | H02M 3/156 |

FOREIGN PATENT DOCUMENTS

| | | |
|---|---|---|
| EP | 2919374 | 9/2015 |
| EP | 2980974 | 2/2016 |

\* cited by examiner

CONTROL DEVICE FOR DC CONVERTER, DC CONVERTER, AND METHOD FOR CONTROLLING A DC CONVERTER

BACKGROUND OF THE INVENTION

The present invention relates to a control apparatus for DC converter and a DC converter comprising such a control apparatus. Further, the present invention relates to a method for regulating the DC converter. In particular, the present invention relates to a regulation of DC converters comprising a plurality of DC-DC converter modules.

DC-DC converters are used to convert a DC voltage provided on an input side into a further DC voltage. Here, the converted DC voltage may deviate from the DC voltage provided on the input side, for example in terms of the voltage level. A plurality of DC-DC converters can be connected in parallel for the purposes of increasing the power. By way of example, a master-slave operation is possible in the case of such a parallel circuit of a plurality of DC-DC converters. Here, the master DC-DC converter adopts the voltage regulation in the output-side overall system. The further DC-DC converter or converters contribute to increasing the output power as a current source that is controlled by the master.

Document EP 1 143 591 B1 discloses a method and an apparatus for regulating the parallel operation of DC-DC converters, in which one of the DC-DC converters exerts a master function and the other DC-DC converters exert a slave function. Here, the master DC-DC converter carries out a voltage regulation while the further DC-DC converters operate as a current source.

SUMMARY OF THE INVENTION

The present invention discloses a control apparatus for a DC converter, a DC converter and a method for regulating a DC converter.

Accordingly, provision is made of:

A control apparatus for DC converter with a plurality of DC-DC converter modules. The control apparatus comprises a feedforward control apparatus, a voltage regulator and a plurality of current regulators. In particular, the number of current regulators in the control apparatus corresponds to the number of DC-DC converter modules in the DC converter. The feedforward control apparatus is configured to generate a first controlled variable. The first controlled variable is generated by the feedforward control apparatus on the basis of a setpoint value for an output voltage of the DC converter and a value for an input voltage of the DC converter. The voltage regulator is configured to generate a second controlled variable. The second controlled variable is generated on the basis of the setpoint value of the output voltage of the DC converter and an ascertained value of the output voltage of the DC converter. Each of the plurality of current regulators has one of the DC-DC converter modules associated therewith. Here, the current regulators are each configured to generate a third controlled variable for the respectively associated DC-DC converter module. The third controlled variables are generated on the basis of a setpoint value for a current in the respectively associated DC-DC converter module and an ascertained value for a current in the respectively associated DC-DC converter module. Subsequently, a combination of the first controlled variable of the feedforward control apparatus, the second controlled variable of the voltage regulator and the third controlled variable of the respectively associated DC-DC converter module can be provided at the respectively associated DC-DC converter module. In particular, this combination can comprise a sum of the first controlled variable, the second controlled variable and the respective third controlled variable.

Further, provision is made of:

A DC converter comprising a plurality of DC-DC converter modules and a control apparatus according to the invention. Here, each of the plurality of DC-DC converter modules is configured to convert an input DC voltage into an output DC voltage.

Furthermore, provision is made of:

A method for regulating a DC converter comprising a plurality of DC-DC converter modules. The method comprises a step for producing a first controlled variable. The first controlled variable is produced on the basis of a setpoint value for an output voltage of the DC converter and a value for an input voltage of the DC converter. Furthermore, the method comprises a step for producing a second controlled variable. The second controlled variable is produced on the basis of a setpoint value for the output voltage of the DC converter and an ascertained value for the output voltage of the DC converter. Furthermore, the method comprises a step for producing a plurality of third controlled variables. Here, a separate third controlled variable can be produced for each DC-DC converter module of the DC converter. Each of these third controlled variables is associated with a DC-DC converter module. The third controlled variable for the respectively associated DC-DC converter module is produced on the basis of a setpoint value for a current in the respectively associated DC-DC converter module and an ascertained value for a current in the respectively associated DC-DC converter module. Finally, the method comprises a step for actuating the plurality of DC-DC converter modules using a combination of the first controlled variable, the second controlled variable and the respective third controlled variable, which is associated with the corresponding DC-DC converter module. Here, the combination of the first, second and third controlled variable can be ascertained by summing the controlled variables, for example.

The present invention is based on the discovery that it is not only the output voltage of the overall system that needs to be set in the case of a parallel circuit of a plurality of DC-DC converters, but also that care has to be taken that there is no overloading of any of the DC-DC converters connected in parallel. In particular, it is necessary to ensure that there is no overloading in any of the DC-DC converters connected in parallel on account of an electric current that is too high, or the like, in order to protect the components and optimize the service life.

The present invention is therefore based on the concept of taking account of this discovery and of providing a DC converter in which there can be an individual current regulation in each of a plurality of DC-DC converter modules connected in parallel. Here, provision is made, in particular, of initially ascertaining common control parameters for the parallel circuit of a plurality of DC-DC converter modules, in as far as this is possible. Subsequently, these control parameters that are relevant to all DC-DC converter modules can be additionally overlaid with a control parameter that has been determined individually for each DC-DC converter module for the purposes of adapting the electric current in the respective DC-DC converter module. In this way, there can be a particularly efficient and, at the same time, individual regulation of the individual DC-DC converter modules.

Since, firstly, the basic regulation is implemented on the basis of centrally ascertained control parameters for all DC-DC converter modules and, moreover, secondly, an additional control parameter is overlaid for each individual DC-DC converter module, this allows a very well scalable regulation of a plurality of DC-DC converter modules connected in parallel to be obtained. In particular, a current regulation that is relatively simple to realize need only be provided for each of the DC-DC converter modules; this can be realized very cost effectively. The further control parameters for regulating the output voltage need only be determined a single time for the entire system. This leads to a particularly compact, and hence cost effective, design of the overall system.

According to one embodiment, the feedforward control of the control apparatus for the DC converter is configured to generate the first controlled variable additionally using the ascertained values for currents in the DC-DC converter modules. To this end, an electric current can be ascertained in the power path of each DC-DC converter module by means of a sensor in each of the DC-DC converter modules and/or by means of suitable modeling, for example. These ascertained electric currents can thereupon be evaluated by the feedforward control. By way of example, a possible voltage drop within the DC-DC converter modules, which should be compensated by regulation, can be determined on the basis of the ascertained currents.

According to one embodiment, the feedforward control is configured to restrict the value of the first controlled variable to a predetermined maximum value and/or a predetermined minimum value. Such a restriction of the maximum value or of the minimum value can ensure that the DC-DC converter modules are always actuated in an admissible and/or optimal working range.

According to one embodiment, the voltage regulator of the control apparatus is configured to restrict the value range for the second controlled variable if all current regulators generate a third controlled variable that differs from zero. In this way, it is possible to ensure that the regulation by the voltage regulator does not go against the regulations by the current regulators. By way of example, an output signal can be provided by each current regulator to this end, said output signal indicating that the current regulator outputs a controlled variable that differs from zero and hence that said current regulator is currently active. By linking the output signals of all current regulators, it is subsequently possible to determine whether all current regulators are currently active and output a controlled variable that differs from zero. In this case, the controlled variable of the voltage regulator can be restricted in such a way that the voltage regulator only undertakes regulation in the same sense as the active current regulators. In this way, regulations of voltage regulator and current regulators that act in opposite senses can be prevented.

According to one embodiment, the first controlled variable, the second controlled variable and the third controlled variables each comprise phase angles for specifying a duty factor. Such controlled variables are very well suited, in particular, to regulate DC-DC converters that are operated on the basis of a pulse width modulation or the like.

According to one embodiment of the DC converter, the DC converter comprises DC-DC converter modules that are configured to carry out a bidirectional DC-DC conversion. In this case, the control apparatus can also undertake a bidirectional regulation of the DC converter, depending on operation.

According to an embodiment of the method for regulating the DC converter, the combination of the first controlled variable, the second controlled variable and the respective third controlled variable comprises a sum of the first controlled variable, the second controlled variable and the respective third controlled variable. In particular, a common controlled variable, which is suitable for regulating the respective DC-DC converter modules, can be formed in a simple manner by the summation of the three controlled variables.

BRIEF DESCRIPTION OF THE DRAWINGS

The present invention is explained in more detail below on the basis of the exemplary embodiments specified in the schematic figures of the drawings. In the figures.

DETAILED DESCRIPTION

Figure 1:
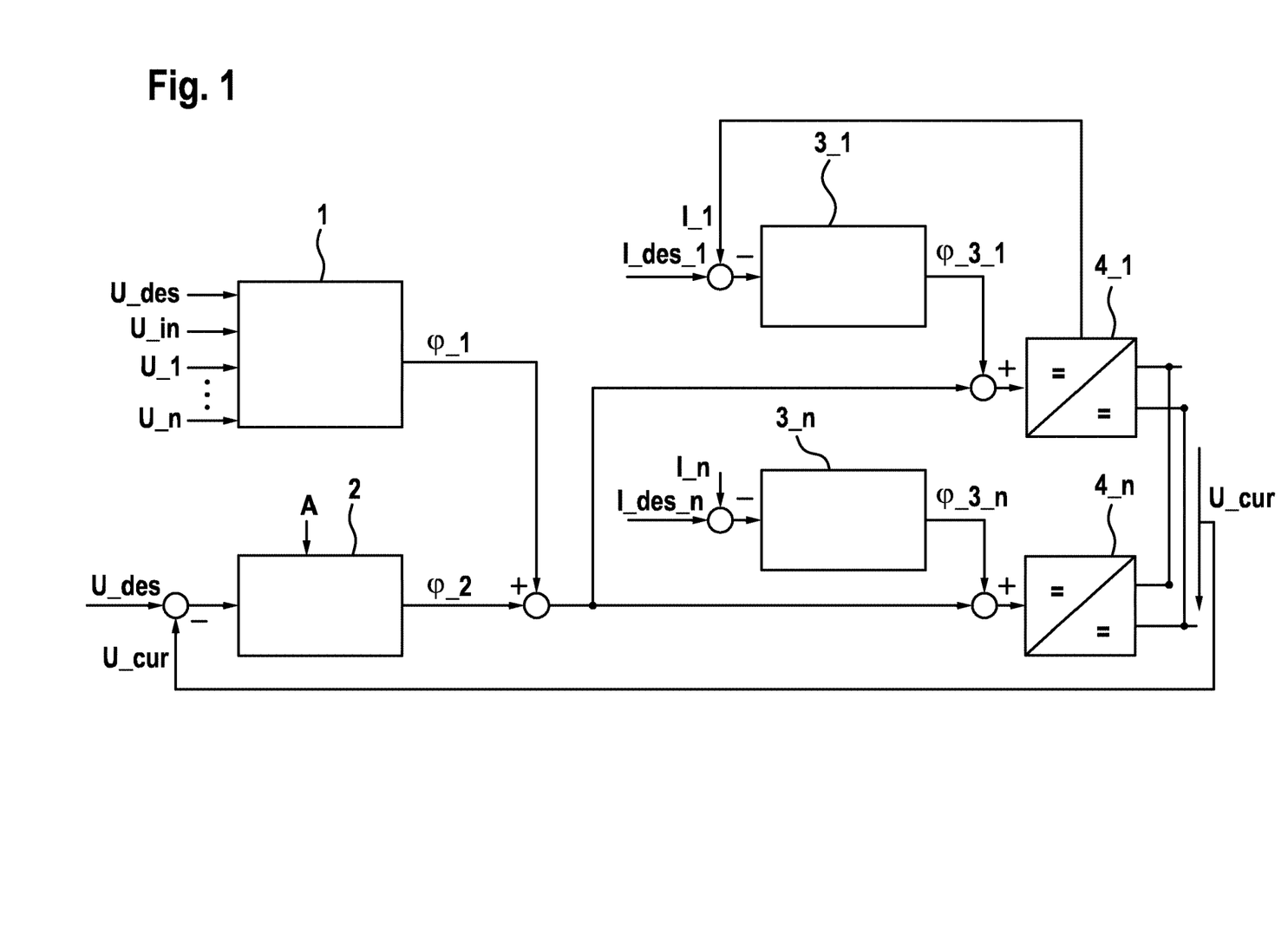
FIG. 1 shows a schematic illustration of the DC converter having a control apparatus according to one embodiment.

FIG. 1 shows a schematic illustration of a DC converter according to one embodiment. The DC converter comprises a plurality of DC-DC converter modules 4-$i$. All of the DC-DC converter modules 4-$i$ are fed in parallel on the input side with an input voltage U_in. The DC-DC converter modules 4-$i$ are likewise connected in parallel on the output side and provide an output voltage U_cur. The DC-DC converter modules 4-$i$ can be so-called DC/DC converters, which convert an input DC voltage into an output DC voltage. Here, in particular, those DC-DC converter modules 4-$i$ that allow a bidirectional operation are also possible; i.e., the DC-DC converter modules both convert a DC voltage provided at a first side into a DC voltage that is provided at a second side, and, alternatively, are also able to convert a DC voltage provided at the second side into a DC voltage that is provided at the first side in this case. The DC-DC converter modules 4-$i$ can be DC-DC converter modules that both convert a DC voltage provided at an input side into a higher output voltage and/or also convert a DC voltage provided at the input side into a DC voltage that is lower than the DC voltage provided at the input side.

The DC-DC converter modules 4-$i$ that are connected in parallel can be a plurality of equal or equivalent DC-DC converter modules. Moreover, it is also possible, however, that some or optionally also all of the DC-DC converter modules 4-$i$ that are connected in parallel have a differing design. In particular, it is also possible to connect in parallel DC-DC converter modules 4-$i$ that have different maximum powers.

A control signal can be provided at each of the DC-DC converter modules 4-$i$ for the purposes of controlling the individual DC-DC converter modules 4-$i$. By way of example, this control signal can be a controlled variable that influences the operation of the respective DC-DC converter module 4-$i$. By way of example, if the actuation within the individual DC-DC converter modules 4-$i$ is implemented by means of a pulse width modulation, the controlled variable of the control signal can set a duty cycle for the pulse width modulation. In particular, a phase angle can be provided as a controlled variable, for example, said phase angle predetermining a duty cycle to be set for a pulse width modulation. Below, a regulator structure is described for the provision of such a controlled variable at the individual DC-DC converter modules 4-$i$.

Three separately produced controlled variables are combined with one another for the purposes of generating the controlled variables for controlling the individual DC-DC converter modules 4-$i$. Here, a feedforward control apparatus 1 produces a first controlled variable $\varphi\_1$ using the value U_in for the input voltage applied at the input side and a setpoint value U_des for the DC voltage to be provided at the output side. Furthermore, a voltage regulator 2 generates a second controlled variable $\varphi\_2$ on the basis of a deviation of the setpoint value U_des for the voltage to be provided at the output side from the actual value U_cur of the DC voltage provided at the output side. Here, it is possible to provide only a single feedforward control apparatus 1 and a single voltage regulator 2 for the entire DC converter. Accordingly, the same first and second controlled variables $\varphi\_1$, $\varphi\_2$ are used for all DC-DC converter modules 4-$i$. A possibly occurring deviation between the setpoint value U_des and the value U_cur of the actual output voltage can be compensated on the basis of this first controlled variable $\varphi\_1$ and the second controlled variable $\varphi\_2$.

Additionally, a further, third controlled variable $\varphi\_3\_i$ is generated for each DC-DC converter module 4-$i$. To this end, a separate current regulator 3-1 is provided for each DC-DC converter module 4-$i$. Here, the current regulator 3-1 produces the third controlled variable $\varphi\_3\_i$ on the basis of a deviation of a predetermined setpoint value I_des_i for an electric current within the corresponding DC-DC converter module 4-$i$ from the current value I_i of the electric current within the corresponding DC-DC converter module 4-$i$. The electric current to be considered can be the electric current within the power path of the DC-DC converter modules 4-$i$. In principle, it is possible, for example, to capture the electric current at an input-side connector, an output-side connector or at any point within the power path of the DC-DC converter module 4-$i$. The electric currents to be considered in the process are preferably captured by means of current sensors. However, in principle, a model-based calculation of the electric currents within the DC-DC converter modules 4-$i$ is also possible.

If the actual current I_i within the DC-DC converter module 4-$i$ corresponds to the respectively predetermined setpoint value I_des_i, there is no adaptation of the centrally ascertained first controlled variable $\varphi\_1$ and of the second controlled variable $\varphi\_2$ by the respective current regulator 3-1. If the actual current value I_i deviates from the respective setpoint value I_des_i, a corresponding third controlled variable $\varphi\_3\_i$ can be output by the corresponding current regulator 3-1 in order to adapt the electric current through the assigned DC-DC converter module 4-$i$. Particularly if the actual electric current I_i is greater than the respective setpoint value I_des_i, the provision of a corresponding third controlled variable $\varphi\_3\_i$ can lower the electric current through the associated DC-DC converter module 4-$i$. In this way, it is possible, for example, to limit the maximum electric current through a DC-DC converter module 4-$i$. Furthermore, it is also possible to restrict or lower the electric current through a DC-DC converter module 4-$i$ in the case of a temperature increase within the corresponding DC-DC converter module 4-$i$ in order to prevent a further temperature increase and, possibly, damage to, or even the destruction of, the corresponding DC-DC converter module 4-$i$.

Moreover, by predetermining the setpoint values I_des_i for the corresponding currents in the DC-DC converter modules 4-$i$, it is possible to set the electric currents and, consequently, the powers according to any prescription. By way of example, it is possible to set an equal distribution in all DC-DC converter modules 4-$i$ arranged in parallel. Further, as already explained above, it is also possible to lower the electric current, and hence the power, in one or more of the DC-DC converter modules 4-$i$ on account of further parameters where necessary. Further, it is also possible to connect a plurality of different DC-DC converter modules 4-$i$ in parallel. In this case, it is possible to set a corresponding adaptation to the different DC-DC converter modules 4-$i$ by predetermining the respective setpoint values I_des_i for the electric currents. In particular, the individual DC-DC converter modules 4-$i$ can each be operated with the same phase control factor in the case of a plurality of different DC-DC converter modules 4-$i$. That is to say that all DC-DC converter modules 4-$i$ that are connected in parallel can be actuated at least approximately uniformly in respect of their maximum power. Moreover, arbitrary further distributions are also possible for the actuation of the DC-DC converter modules 4-$i$ that are connected in parallel.

Figure 2:
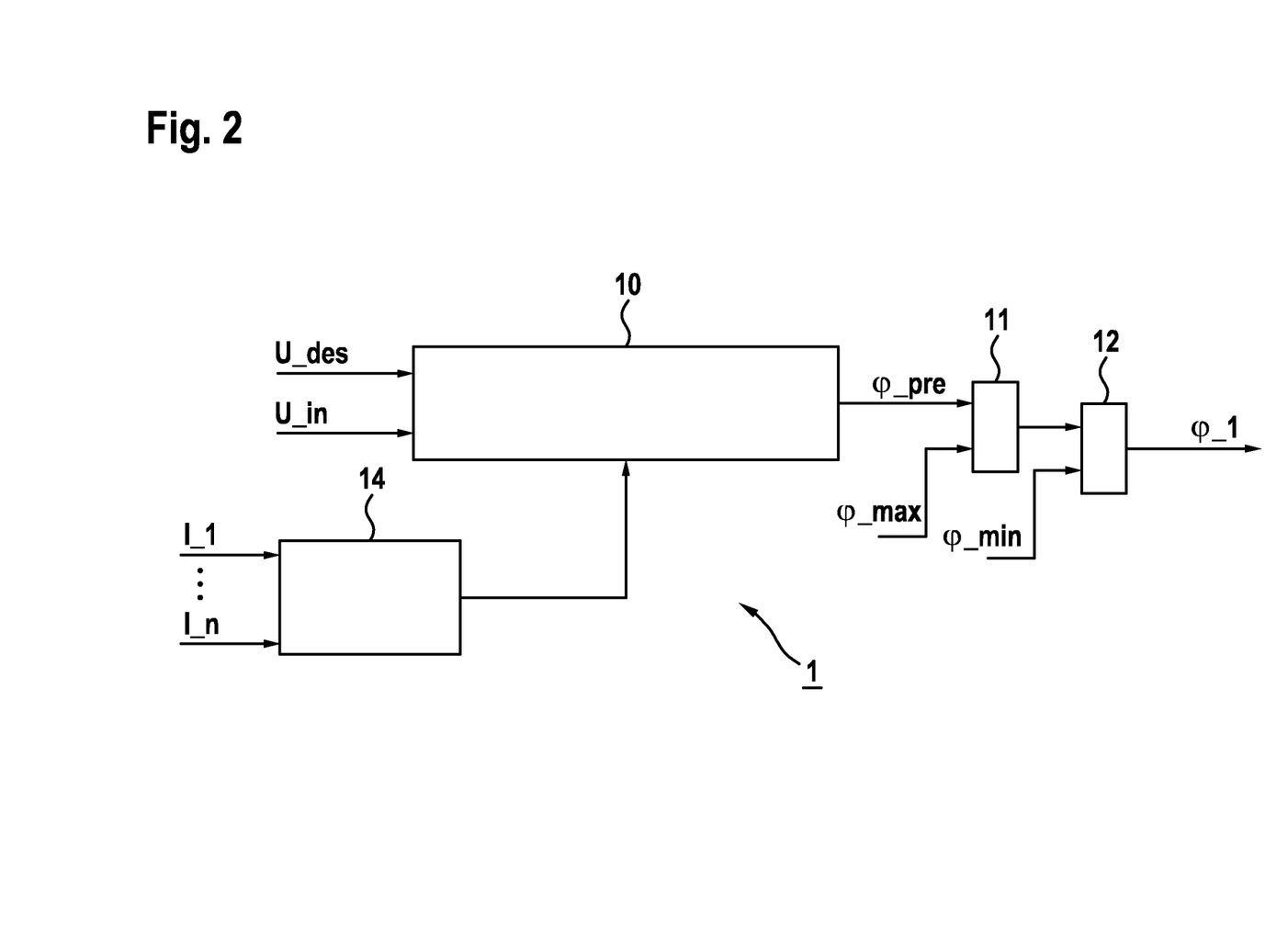
FIG. 2 shows a schematic illustration of a regulator structure for a feedforward device according to one embodiment.

FIG. 2 shows a schematic illustration of a regulator structure for a feedforward control apparatus 1 for the control apparatus according to one embodiment. The feedforward control apparatus 1 generates a first controlled value $\varphi\_1$, which initially represents a basic controlled variable for the DC-DC converter modules 4-$i$ of the DC converter. This first controlled variable $\varphi\_1$ is generated, in particular, using the setpoint value U_des of the DC converter and the value of the input voltage U_in of the DC converter. Moreover, the feedforward control apparatus 1 can also evaluate the electric currents in the individual DC-DC converter modules 4-$i$. A voltage drop within the components of the DC-DC converter modules 4-$i$ can be ascertained on the basis of these electric currents I_i in the DC-DC converter modules 4-$i$ and said voltage drop can also be taken into account when determining the first controlled variable $\varphi\_1$. Initially, a controlled variable $\varphi\_{pre}$ can be calculated in the control apparatus 10 from these parameters, in particular the setpoint value U_des for the output voltage, the value U_in for the input voltage and, optionally, the electric currents I_i through the DC-DC converter modules 4-$i$. Further, this controlled variable $\varphi\_{pre}$ can be restricted to a minimum value $\varphi\_{min}$ and/or a maximum value p max where necessary by way of the restriction elements 11 and 12. Consequently, the feedforward control apparatus 1 provides the first controlled variable $\varphi\_1$ as an output.

Figure 3:
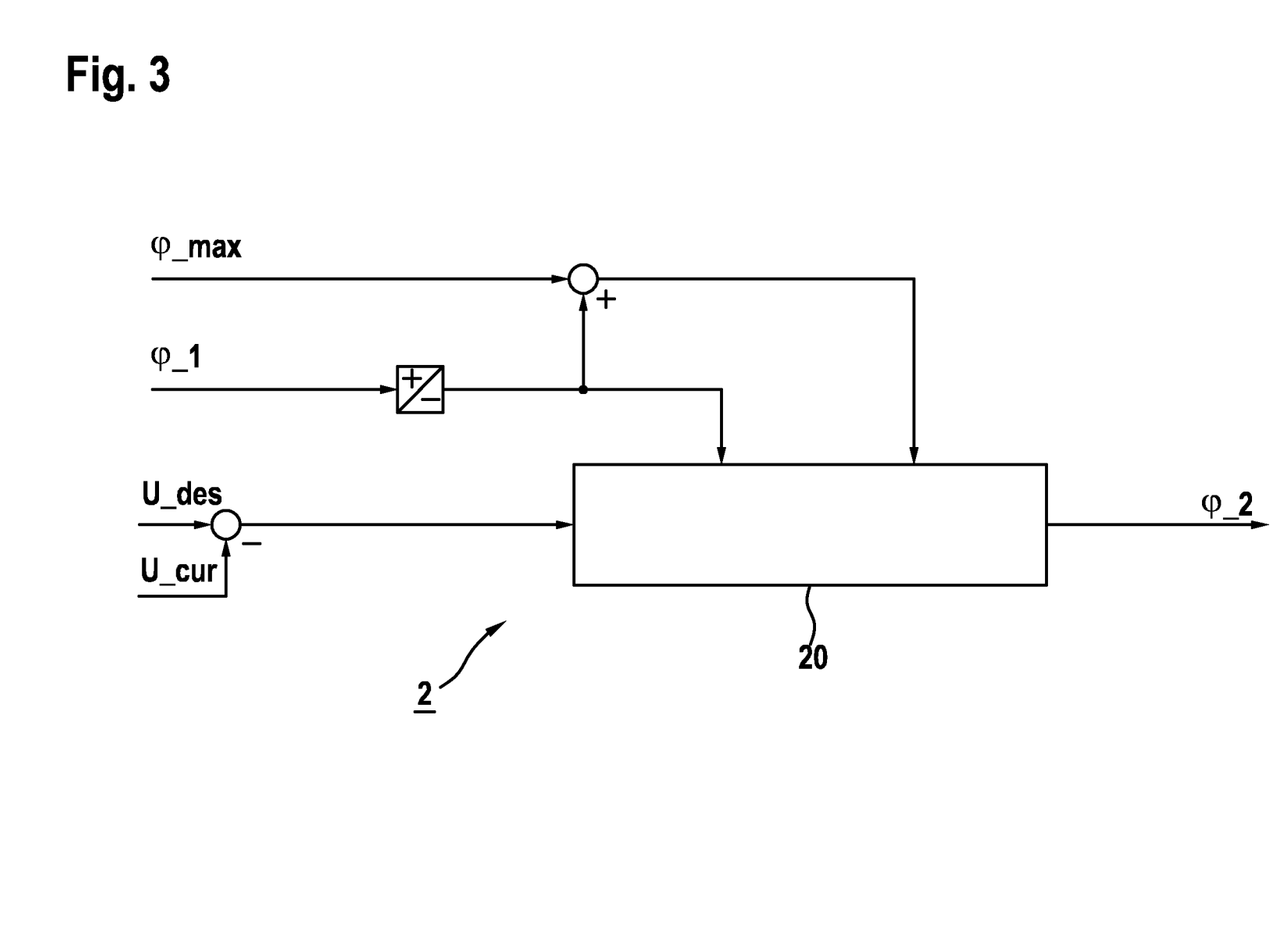
FIG. 3 shows a schematic illustration of a regulator structure for a voltage regulator according to one embodiment.

FIG. 3 shows a schematic illustration of a regulator structure for a voltage regulator 2 of a control apparatus according to one embodiment. The voltage regulator 2 initially compares the actual voltage U_cur with a setpoint value U_des for the output voltage. The difference of these two values represents an input value for a control apparatus, for example a PID controller. However, therebeyond, use can also be made of a control apparatus that deviates from a PID controller, depending on the application. Further, this control apparatus 20 can also take account of a prescription for maximum value and minimum value of the second controlled variable $\varphi\_2$ to be ascertained. In particular, a difference between the maximum value $\varphi\_{max}$ and the first controlled variable $\varphi\_1$ can be predetermined as a maximum for the second controlled variable $\varphi\_2$, for example as a maximum value of the second controlled variable $\varphi\_2$. By way of example, a minimum value for the second controlled variable $\varphi\_2$ can be predetermined as the negative value of the controlled variable $\varphi\_1$. Consequently, the voltage regulator 2 can completely compensate the first controlled variable $\varphi\_1$ in the extreme case. The voltage regulator 2 supplies the second controlled variable $\varphi\_2$ as an output signal.

Figure 4:
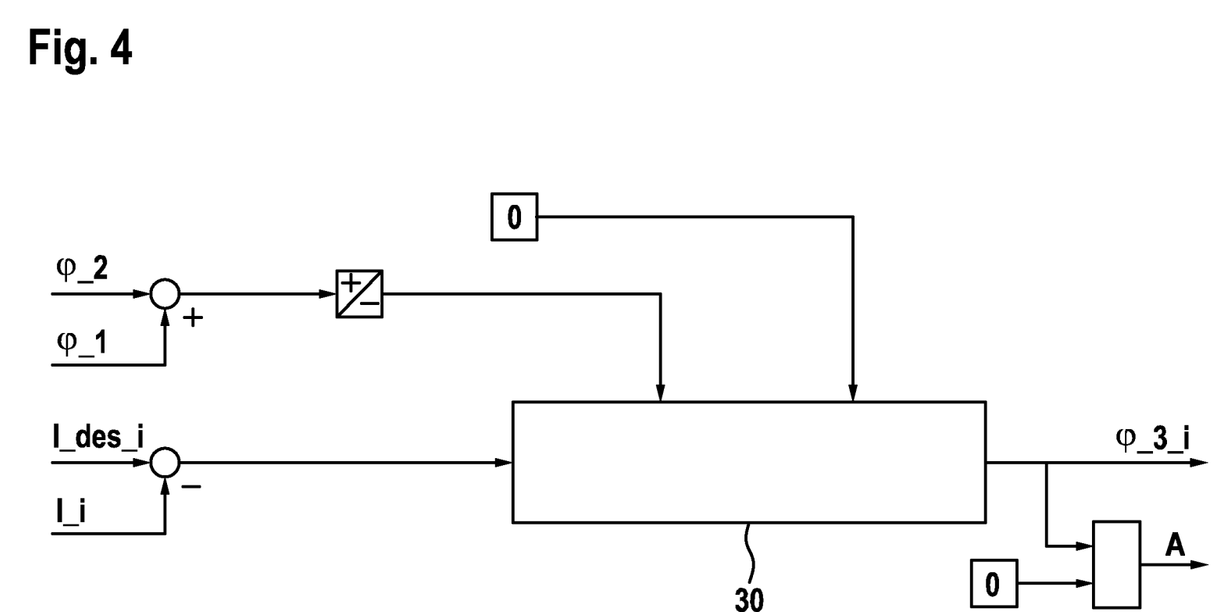
FIG. 4 shows a schematic illustration of a regulator structure for a current regulator according to one embodiment.

FIG. 4 shows a schematic illustration of a regulator structure for a current regulator 3-1 of a control apparatus according to one embodiment. The current regulator 3-1 initially forms a difference between a setpoint value I_des_i for the current in the associated DC-DC converter module 4-$i$ and the actual value of the electric current I_i in the corresponding DC-DC converter module 4-$i$. This difference forms the output value for the third controlled variable $\varphi\_3\_i$ that is to be ascertained by the current regulator 3-$i$. By way of example, this difference can be supplied to a control apparatus 30, in particular to a PID controller, for example. Furthermore, this control apparatus 30 can take account of prescriptions for a maximum value and a minimum value of the third controlled variable $\varphi\_3\_i$ to be output. In the example illustrated here, a value of zero is output as a maximum value for the controlled variable to be output. That is to say, the current regulator 3-$i$ can only reduce the first and second controlled variable $\varphi\_1$, $\varphi\_2$. By way of example, the negative difference between the second controlled variable $\varphi\_2$ and the first controlled variable $\varphi\_1$ can be predetermined as minimum value. From this, the control apparatus of the current regulator 3-$i$ generates a third controlled variable $\varphi\_3\_i$, and outputs the latter. Further, a check can be carried out by means of the comparator 31 or by means of any other suitable device as to whether the output third controlled variable $\varphi\_3\_i$ deviates from zero. In this case, the current regulator 3-$i$ is active and the comparator 31 outputs a corresponding signal A.

For the purposes of actuating a DC-DC converter module 4-$i$, the first controlled variable $\varphi\_1$ and the second controlled variable $\varphi\_2$ are summed and the third controlled variable $\varphi\_3\_i$ of one of the current regulators 3-$i$ is added to this sum in each case. The sum of the three controlled variables formed thus is supplied to the corresponding DC-DC converter module 4-$i$. In this way, an individual controlled variable $\varphi\_3\_i$ can be established for each DC-DC converter module 4-$i$ from the first controlled variable $\varphi\_1$ and second controlled variable $\varphi\_2$, which are jointly ascertained for all DC-DC converter modules 4-$i$, and from an individual third controlled variable $\varphi\_3\_i$, which was generated by means of a current regulator 3-$i$ associated with the DC-DC converter module 4-$i$.

Consequently, each DC-DC converter module 4-$i$ can be actuated individually by way of a suitable controlled variable. The first controlled variable $\varphi\_1$, the second controlled variable $\varphi\_2$ and the respective third controlled variable $\varphi\_3\_i$ are respectively added in the process and subsequently supplied to the corresponding DC-DC converter module 4-$i$.

The regulation of the DC-DC converter modules 4-$i$ can be carried out as explained above for as long as at least one current regulator 3-1 is not active, i.e., for as long as at least one of the current regulators 3-1 outputs a value of zero as third controlled variable $\varphi\_3\_i$.

The voltage regulator 2 should only correct the second controlled variable $\varphi\_2$ in the same sense as the current regulator 3-1 if all current regulators 3-$i$ simultaneously output a controlled variable $\varphi\_3\_i$ that differs from zero and consequently if the electric current is restricted in all DC-DC converter modules 4-$i$. To this end, the above-described signal, which indicates whether the current regulators 3-$i$ are active, can be supplied to the voltage regulator 2. Thereupon, the voltage regulator 2 is able to check whether all current regulators 3-$i$ limit the current. In this case, the regulation by the voltage regulator 2 can be adapted accordingly such that the voltage regulator 2 only outputs a second controlled variable $\varphi\_2$, which changes the first controlled variable $\varphi\_1$ in the same sense as the third controlled variables $\varphi\_3\_i$ of the current regulators 3-$i$.

Figure 5:
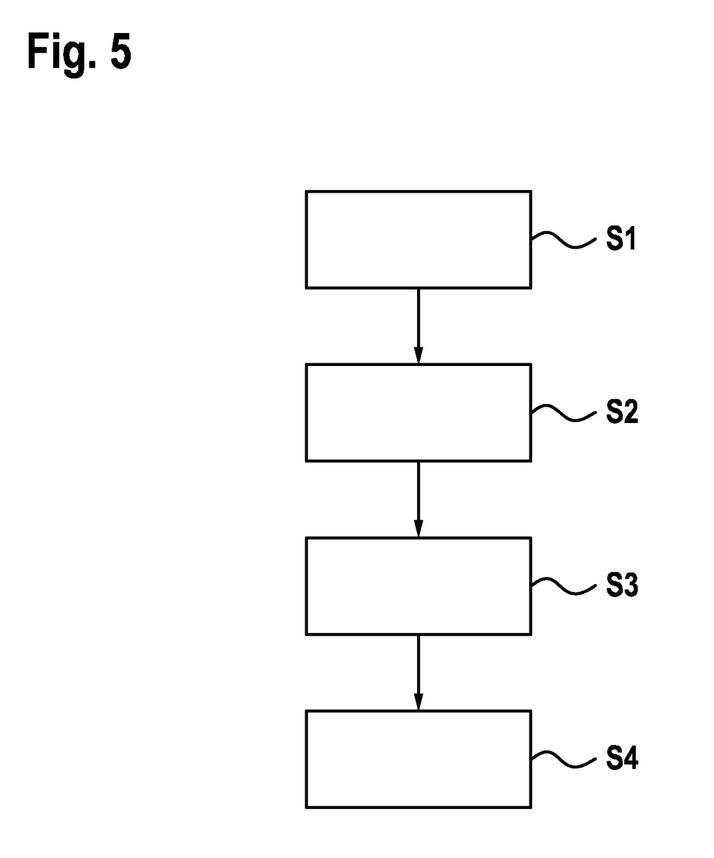
FIG. 5 shows a schematic illustration of a flowchart for a method for regulating a DC converter, as underlies one embodiment.

FIG. 5 shows a schematic illustration of a flowchart, as underlies a method for regulating a DC converter comprising a plurality of DC-DC converter modules 4-$i$. The first controlled variable $\varphi\_1$ is produced in step S1. The first controlled variable $\varphi\_1$ is ascertained, in particular, on the basis of a setpoint value U_des for an output voltage of the DC converter and a value U_cur for an input voltage of the DC converter. A second controlled variable $\varphi\_2$ is produced in step S2. In particular, the second controlled variable $\varphi\_2$ is produced on the basis of the setpoint value U_des of the output voltage of the DC converter and an ascertained value U_cur of the output voltage of the DC converter. A plurality of third controlled variables $\varphi\_3\_i$ are produced in step S3. The third controlled variables $\varphi\_3\_i$ are each assigned to one of the DC-DC converter modules 4-$i$. The third controlled variables $\varphi\_3\_i$ are produced for each associated DC-DC converter module 4-$i$ on the basis of a setpoint value I_des_i for a current in the respectively associated DC-DC converter module 4-$i$ and an ascertained value I_i for a current in the respectively associated DC-DC converter module 4-$i$. In step S4, the DC-DC converter modules 4-$i$ are actuated by a combination of the first controlled variable $\varphi\_1$, the second controlled variable $\varphi\_2$ and the third controlled variables $\varphi\_3\_i$ of the respectively associated DC-DC converter module 4-$i$. Here, the combination of the first controlled variable $\varphi\_1$, the second controlled variable $\varphi\_2$ and the third controlled variables $\varphi\_3\_i$ may comprise, in particular, a sum of the three controlled variables.

In conclusion, the present invention relates to a regulation for a DC converter comprising a plurality of DC-DC converter modules that are connected in parallel. Here, a common variable for the voltage regulation is formed for regulating all DC-DC converter modules. Additionally, a separate current regulator is provided for each DC-DC converter module. A controlled variable can be formed for each DC-DC converter module from the individually ascertained current regulation and the jointly ascertained voltage regulation.

The invention claimed is:

1. A control apparatus for a DC converter with a plurality of DC-DC converter modules (4-$i$), comprising:
   a feedforward control apparatus (1) configured to generate a first controlled variable ($\varphi\_1$) based on a first setpoint value (U_des) for an output voltage of the DC converter and a value (U_in) for an input voltage of the DC converter;
   a voltage regulator (2) configured to generate a second controlled variable ($\varphi\_2$) based on the first setpoint value (U_des) for the output voltage of the DC converter and a first ascertained value (U_cur) for the output voltage of the DC converter;
   a plurality of current regulators (3-$i$) each of the current regulators (3-$i$) being associated with a DC-DC converter module (4-$i$) and the current regulators (3-$i$) are each configured to generate a third controlled variable ($\varphi\_3\_i$) for the respectively associated DC-DC converter module (4-$i$) based on a second setpoint value (I_des_i) for a current in the respectively associated DC-DC converter module (4-$i$) and a second ascertained value (I_i) for a current in the respectively associated DC-DC converter module (4-$i$), wherein a combination of the first controlled variable ($\varphi\_1$), the second controlled variable ($\varphi\_2$) and the third controlled variable ($\varphi\_3\_i$) of the respectively associated DC-DC converter module (4-$i$) is provided at the respectively associated DC-DC converter module (4-$i$).

2. The control apparatus as claimed in claim 1, wherein the feedforward control apparatus (1) is configured to generate the first controlled variable ($\varphi\_1$) using the second ascertained values (I_i) for the current in the DC-DC converter modules (4-$i$).

3. The control apparatus as claimed in claim 1, wherein the feedforward control apparatus (1) is configured to restrict the first controlled variable ($\varphi\_1$) to a predetermined maximum value ($\varphi\_max$).

4. The control apparatus as claimed in claim 1, wherein the voltage regulator (2) is configured to restrict a value range for the second controlled variable ($\varphi\_2$) when the third controlled variable ($\varphi\_3\_i$) generated from all current regulators (3-$i$) differs from zero.

5. The control apparatus as claimed in claim 1, wherein the first controlled variable ($\varphi\_1$), the second controlled variable ($\varphi\_2$) and the third controlled variables ($\varphi\_3\_i$) each comprise phase angles for specifying a duty factor.

6. A DC converter comprising:
the plurality of DC-DC converter modules (4_$i$) wherein each configured to convert an input DC voltage (U_in) into an output DC voltage; and
the control apparatus as claimed in claim 1, wherein a separate current regulator (3-$i$) is provided in the control apparatus for each DC-DC converter module (4-$i$) in the DC converter.

7. The DC converter as claimed in claim 6, wherein the DC-DC converter modules (4-$i$) are configured to carry out a bidirectional DC-DC conversion.

8. The control apparatus as claimed in claim 1, wherein the feedforward control apparatus (1) is configured to restrict the first controlled variable ($\varphi\_1$) to a predetermined minimum value ($\varphi\_min$).

9. The control apparatus as claimed in claim 1, wherein the feedforward control apparatus (1) is configured to restrict the first controlled variable ($\varphi\_1$) to a predetermined maximum value ($\varphi\_max$) and to a predetermined minimum value ($\varphi\_min$).

10. A method for regulating a DC converter comprising a plurality of DC-DC converter modules (4-$i$), the method comprising:
producing (S1) a first controlled variable ($\varphi\_1$) based on a first setpoint value (U_des) for an output voltage of the DC converter and a value (U_in) for an input voltage of the DC converter;
producing (S2) a second controlled variable ($\varphi\_2$) based on the first setpoint value (U_des) of the output voltage of the DC converter and a first ascertained value (U_cur) of the output voltage of the DC converter;
producing (S3) a plurality of third controlled variables ($\varphi\_3\_i$), wherein each third controlled variable ($\varphi\_3\_i$) is associated with a DC-DC converter module (4-$i$) and the third controlled variable ($\varphi\_3\_i$) for the respectively associated DC-DC converter module (4-$i$) is produced on the basis of a second setpoint value (I_des_i) for a current in the respectively associated DC-DC converter module (4-$i$) and a second ascertained value (I_i) for a current in the respectively associated DC-DC converter module (4-$i$);
actuating (S4) the DC-DC converter modules (4-$i$) using a combination of the first controlled variable ($\varphi\_1$), the second controlled variable ($\varphi\_2$) and the third controlled variable ($\varphi\_3\_i$) of the respectively associated DC-DC converter module (4-$i$).

11. The method as claimed in claim 10, wherein the combination of the first controlled variable ($\varphi\_1$), the second controlled variable ($\varphi\_2$) and the respective third controlled variable ($\varphi\_3\_i$) is formed by a sum of the first controlled variable ($\varphi\_1$), the second controlled variable ($\varphi\_2$) and the respective third controlled variable ($\varphi\_3\_i$).

* * * * *